(12) United States Patent
Ryf et al.

(10) Patent No.: US 9,819,439 B2
(45) Date of Patent: Nov. 14, 2017

(54) MULTI-MODE OPTICAL COMMUNICATION WITH MODE MIXTURES

(71) Applicant: Alcatel-Lucent USA Inc., Murray Hill, NJ (US)

(72) Inventors: Roland Ryf, Aberdeen, NJ (US); Rene'-Jean Essiambre, Red Bank, NJ (US); Nicolas Fontaine, Keyport, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 237 days.

(21) Appl. No.: 13/786,844

(22) Filed: Mar. 6, 2013

(65) Prior Publication Data
US 2014/0153922 A1    Jun. 5, 2014

Related U.S. Application Data

(60) Provisional application No. 61/608,139, filed on Mar. 8, 2012, provisional application No. 61/669,612, filed
(Continued)

(51) Int. Cl.
*H04B 10/04* (2006.01)
*H04B 10/12* (2006.01)
(Continued)

(52) U.S. Cl.
CPC ............ *H04J 14/04* (2013.01); *G02B 6/0288* (2013.01); *G02B 6/2804* (2013.01); *H04B 10/2581* (2013.01); *H04B 10/50* (2013.01)

(58) Field of Classification Search
CPC .. H04B 10/12; H04B 10/2581; H04B 10/611; G02B 6/4206; H04J 14/04
(Continued)

(56) References Cited

U.S. PATENT DOCUMENTS 5,008,545 A * 4/1991 Anderson .......... G01M 11/3109
250/341.8
5,799,118 A * 8/1998 Ogusu ................ G02B 6/12007
385/14
(Continued)

FOREIGN PATENT DOCUMENTS

CN    102224691 A    10/2011
EP    2 372 420 A1    10/2011
(Continued)

OTHER PUBLICATIONS

Steven Roman, Advanced Linear Algebra, Sep. 20, 2007, Springer Science and Business Media, p. 218.*
(Continued)

*Primary Examiner* — David Payne
*Assistant Examiner* — Pranesh Barua
(74) *Attorney, Agent, or Firm* — John F. McCabe (57) ABSTRACT

An apparatus includes an optical transmitter having a plurality of optical data modulators and an end-face coupler. Each of the optical data modulators is configured to output a corresponding data-modulated optical carrier. The optical end-face coupler is configured to direct the data-modulated optical carriers into a pattern of light beams to illuminate an end-face of a multi-mode optical fiber with a pattern of light spots. The optical end-face coupler is configured to cause each of the data-modulated optical carriers to excite a set of orthonormal optical propagating modes of the multi-mode optical fiber. Some of the orthonormal optical propagating modes of the set have nontrivially differing intensity and/or phase profiles.

21 Claims, 9 Drawing Sheets

Related U.S. Application Data on Jul. 9, 2012, provisional application No. 61/701,646, filed on Sep. 15, 2012.

(51) Int. Cl.

| | |
|---|---|
| H04J 14/04 | (2006.01) |
| H04B 10/2581 | (2013.01) |
| H04B 10/50 | (2013.01) |
| G02B 6/028 | (2006.01) |
| G02B 6/28 | (2006.01) |

(58) Field of Classification Search
USPC .......................................... 398/44, 139, 148
See application file for complete search history.

(56) References Cited

U.S. PATENT DOCUMENTS

| | | | | |
|---|---|---|---|---|
| 7,196,317 | B1* | 3/2007 | Meissner, II | A61B 5/1115 250/227.14 |
| 7,317,857 | B2* | 1/2008 | Manyam | G02B 6/02033 385/126 |
| 7,327,914 | B1* | 2/2008 | Kahn | G02B 6/4206 385/15 |
| 7,864,820 | B2* | 1/2011 | Shimotsu | H01S 3/2383 372/26 |
| 8,977,121 | B2* | 3/2015 | Djordjevic | H04B 10/25 398/43 |
| 2004/0246490 | A1* | 12/2004 | Wang | A61B 5/0059 356/479 |
| 2005/0265678 | A1* | 12/2005 | Manyam | G02B 6/02033 385/127 |
| 2006/0133714 | A1* | 6/2006 | Sappey | G01J 3/02 385/13 |
| 2006/0186332 | A1* | 8/2006 | Haase | H01J 49/067 250/288 |
| 2007/0019917 | A1* | 1/2007 | Bayindir | C03B 37/026 385/123 |
| 2007/0236698 | A1* | 10/2007 | Dogariu | G01N 21/4738 356/479 |
| 2010/0098431 | A1* | 4/2010 | Donlagic | G02B 6/03627 398/143 |
| 2010/0135656 | A1 | 6/2010 | Khurgin et al. | |
| 2010/0329670 | A1* | 12/2010 | Essiambre | H04B 10/2581 398/43 |
| 2010/0329671 | A1* | 12/2010 | Essiambre | G02B 6/14 398/44 |
| 2010/0329693 | A1* | 12/2010 | Chen | H04B 10/85 398/147 |
| 2011/0069975 | A1 | 3/2011 | Liu et al. | |
| 2011/0091178 | A1* | 4/2011 | Gapontsev | G02B 6/02023 385/127 |
| 2011/0150061 | A1* | 6/2011 | Winzer | H04B 10/1125 375/224 |
| 2011/0229130 | A1 | 9/2011 | Yokoi | |
| 2011/0243490 | A1 | 10/2011 | Ryf | |
| 2011/0243574 | A1* | 10/2011 | Essiambre | G02B 6/29311 398/200 |
| 2012/0251105 | A1* | 10/2012 | Kwok | G02B 6/0288 398/44 |
| 2012/0328255 | A1* | 12/2012 | Bickham | G02B 6/02019 385/124 |
| 2013/0068937 | A1* | 3/2013 | Ryf | G02B 6/4206 250/227.11 |
| 2014/0093205 | A1* | 4/2014 | Gruner-Nielsen | G02B 6/0288 385/43 |
| 2014/0126915 | A1* | 5/2014 | Gruner-Nielsen | H04J 14/04 398/143 |

FOREIGN PATENT DOCUMENTS

| | | |
|---|---|---|
| WO | WO 2010/151484 A1 | 12/2010 |
| WO | WO 2011/126814 A2 | 10/2011 |

OTHER PUBLICATIONS

A.R. Vasishtha, A.K. Vasishtha, Matrices, 2010, Krishna Educational Publishers, p. 290.*
David S. Wakins, The Matrix Eigenvalue Problem, 2007, Society of Industrial and Appllied Mathematics, p. 19.*
Encyclopedia of Laser Physics and Technology, www.rp-photonics.com/lp_modes.html.*
Ryf, R. et al., "Multimode Optical Communication Apparatus and Methods", U.S. Appl. No. 61/608,139, filed Mar. 8, 2012.
Ryf, R. et al., "Mode Coupler for Mode-Multiplexed Transmission", U.S. Appl. No. 61/669,612, filed Jul. 9, 2012.
Essiambre, R-J. et al., Multi-Mode Optical Transmission Line With Differential Modal Group Delay Compensation, U.S. Appl. No. 61/701,613, filed Sep. 15, 2012.
Ryf, R. et al., "Spot-Based Coupling in Multi-Mode Optical Communication", U.S. Appl. No. 61/701,646, filed Sep. 15, 2012.
Ryf, R. et al., "Multi-Mode Optical Fiber Amplifier", U.S. Appl. No. 61/692,735, filed Aug. 24, 2012.
Essiambre, R-J. et al., "Multimode Optical Fiber, Mode Delay Adjuster for Fiber Systems, and Methods to Use Such Fibers, Adjusters, and Systems", U.S. Appl. No. 13/539,371, filed Jun. 30, 2012.
Ryf, R., "Multi-Mode Optical Fiber Amplifier", U.S. Appl. No. 13/632,038, filed Sep. 30, 2012.
Black, R. J. et al., Optical Waveguide Modes: Polarization Coupling and Symmetry, McGraw-Hill Professional, 2010.
Buck, J. A., Fundamentals of Optical Fibers, New York: Wiley, 1995.
Fontaine, N. K. et al., "Characterization of Space-Division Multiplexing Systems using a Swept-Wavelength Interferometer", OSA, Technical Digest, OFC/NFOEC OW1K.2.pdf, Mar. 17, 2013, 3 pgs.
Fontaine, N. K. et al., "Characterization of Mode-Dependent Loss of Laser Inscribed Photonic Lanterns for Space Division Multiplexing Systems", OECC/PS, Jun. 30, 2013-Jul. 4, 2013, 2 pgs.
Fontaine, N. K. et al., "Wavelength Blocker for Few-Mode-Fiber Space-Division Multiplexed Systems", OSA, Technical Digest, Optical Fiber Communication Conference (OFC), Mar. 17, 2013, 3 pgs.
Ryf, R., et al., "32-bit/s/Hz Spectral Efficiency WDM Transmission over 177-km Few-Mode Fiber", OSA, Technical Digest, Optical Fiber Communication Conference (OFC), Mar. 19, 2013, 3 pgs.
Ryf, Roland et al., "Mode-Division Multiplexing Over 96 km of Few-Mode Fiber Using Coherent 6×6 MIMO Processing", J. of Lightwave Technology, vol. 30, No. 4, Feb. 15, 2012, pp. 521-531.
Koonen, Ton et al., "New techniques for extending the capabilities of multimode fibre networks" Proceedings of the 8th European Conference on Networks & Optical Communications, XP009185249, Jul. 1, 2003, 8 pages.
Tsekrekos, C. P. et al., "Design Considerations for a Transparent Mode Group Diversity Multiplexing Link", IEEE Photonics Technology Letters, vol. 18, No. 22, Nov. 2006, pp. 2359-2361.
Supplementary European Search Report, EP 13 75 8048, dated Oct. 21, 2015, 3 pages.
Korean Patent Publication Application KR 10-2011-0097808 (dated Aug. 31, 2011) pp. 1-17.
PCT International Search Report, PCT/US2013/029320, International Filing Date Mar. 6, 2013, 5 pgs.
Bulow, H. et al., "Coherent Multimode-Fiber MIMO Transmission With Spatial Constellation Modulation", ECOC Technical Digest (2011) Tu5B.3, pp. 1-3.
Bland-Hawthorn, Joss et al., "PIMMS: photonic integrated multimode microspectrograph", Proc. of Spie, vol. 7735 77350N (2010) pp. 1-9.
Bulow, Henning, "Optical-Mode Demultiplexing by Optical MIMO Filtering of Spatial Samples", IEEE Photonics Technology Letters, vol. 24, No. 12 (Jun. 15, 2012) pp. 1045-1047.
Carpenter, Joel et al., "Precise modal excitation in multimode fibre for control of modal dispersion and mode-group division multiplexing", "European Conference on Communications Technical Digest", Optical Society of America (2011) paper We.10.P1.62, 3 pgs.

(56) References Cited

OTHER PUBLICATIONS

Chen, Xi et al., "Reception of mode-division multiplexed superchannel via few-mode compatible optical add/drop multiplexer", Optics Express, vol. 20, No. 13 (Jun. 18, 2012) pp. 14302-14307.
Chraplyvy, A., "The Coming Capacity Crunch", Presentation at "European Conference on Optical Communication" (2009) Slides 1 and 3-38.
Fontaine, Nicolas K. et al., "Evaluation of Photonic Lanterns for Lossless Mode-Multiplexing", ECOC Technical Digest (2012) Th2.D.6, 3 pgs.
Fontaine, Nicolas K., et al., "Geometric requirements for photonic lanterns in space division multiplexing", Optics Express, vol. 20, No. 24 (Nov. 19, 2012) pp. 27123-27132.
Fontaine, Nicolas K, et al., "Space-division multiplexing and all-optical MIMO demultiplexing using a photonic integrated circuit", Proc. Opt. Fiber Commun. Conf. (2012) p. PDP5B.1, 3 pgs.
Freund, Ronald E., et al., "High-Speed Transmission in Multimode Fibers", J. of Lightwave Technology, vol. 28, No. 4 (Feb. 15, 2010) pp. 569-586.
Gifford, Dawn K., et al., "Optical vector network analyzer for single-scan measurements of loss, group delay, and polarization mode dispersion", Applied Optics, vol. 44, No. 34 (Dec. 1, 2005) pp. 7282-7286.
Heffner, B. L., "Automated Measurement of Polarization Mode Dispersion Using Jones Matrix Eigenanalysis", IEEE Photonics Technology Letters, vol. 4, No. 9 (Sep. 1992) 1066-1069.
Ho, Keang-Po, et al., "Statistics of Group Delays in Multimode Fiber With Strong Mode Coupling", J. of Lightwave Technology, vol. 29, No. 21 (Nov. 1, 2011) pp. 3119-3128.
Ip, Ezra, et al., "88×3×112-Gb/s WDM Transmission over 50 km of Three-Mode Fiber with Inline Few-Mode Fiber Amplifier", ECOC Postdeadline Papers (2011) OSA, Th.13.C.2, 3 pgs.
Leon-Saval, S. G. et al., "Multimode fiber devices with single-mode performance", Optics Letters, vol. 30, No. 19 (Oct. 1, 2005) pp. 2545-2547.
Leon-Saval, S. G. et al., "Photonic lanterns: a study of light propagation in multimode to single-mode converters", Optics Express, vol. 18, No. 8 (Apr. 12, 2010) pp. 8430-8439.
Noordegraaf, D. et al., "Multi-mode to single-mode conversion in a 61 port Photonic Lantern", Optics Express, vol. 18, No. 5 (Mar. 1, 2010) pp. 4673-4678.
Randel, Sebastian et al., "6×56-Gb/s mode-division multiplexed transmission over 33-km few-mode fiber enabled by 6×6 MIMO equalization", Optics Express, vol. 19, No. 17 (Aug. 15, 2011) pp. 16697-16707.
Randel, S. et al., "Mode-Multiplexed 6×20-GBd QPSK Transmission over 1200-km DGD-Compensated Few-Mode Fiber", OFC/NFOEC Post deadline Paper, PDP5C.5 (2012) 3 pgs.
Ryf, R. et al, "12×12 MIMO Transmission over 130-km Few-Mode Fiber", Frontiers in Optics, FW6C.4 (2012) 2 pgs.
Ryf, R. et al., "Low-Loss Mode Coupler for Mode-Multiplexed transmission in Few-Mode Fiber", OFC/NFOEC Postdeadline Papers, PDP5B.5 (2012) 3 pgs.
Ryf, Roland et al., "Mode-Division Multiplexing Over 96 km of Few-Mode Fiber Using Coherent 6×6 Mimo Processing", J. of Lightwave Technology, vol. 30, No. 4 (Feb. 15, 2012) pp. 521-531.
Ryf, Roland et al., "Mode-Equalized Distributed Raman Amplification in 137-km Few-Mode Fiber", ECOC Postdeadline Papers, Th.13K5 (2011) 3 pgs.
Rfy, Roland et al., "Space-division multiplexing over 10 km of three-mode fiber using coherent 6×6 Mimo processing", OSA/OFC/NFOEC, PDPB10 (2011) 3 pgs.
Ryf, Roland et al., "Spot-Based Mode Coupler for Mode-Multiplexed Transmission in Few-Mode Fiber", IEEE, TuC3.2 (2012) pp. 199-200.
Van Wiggeren, Gregory D. et al., "Swept-Wavelength Interferometric Analysis of Multipart Components", IEEE Photonics Technology Letters, vol. 15, No. 9 (Sep. 2003) pp. 1267-1269.
Bai, Neng et al., "Mode-division multiplexed transmission with inline few-mode fiber amplifier", Optics Express, vol. 20, No. 3 (Jan. 30, 2012) pp. 2668-2680.
Bland-Hawthorn, Joss et al., "Astrophotonics: a new era for astronomical instruments", Optics Express, vol. 17, No. 3 (Feb. 2, 2009) pp. 1880-1884.
Winzer, Peter J. et al., "MIMO capacities and outage probabilities in spatially multiplexed optical transport systems", Optics Express, vol. 19, No. 17 (Aug. 15, 2011) pgs. 16680-16696.
Nicholson, J. W. et al., "Spatially and spectrally resolved imaging of modal content in large-mode-area fibers", Optics Express, vol. 16, No. 10 (May 12, 2008) pp. 7233-7243.
Ma, Y. Z. et al., "Fiber-modes and fiber-anisotropy characterization using low-coherence interferometry", Applied Physics B, Lasers and Optics, 96 (2009) pp. 345-353.

\* cited by examiner

MULTI-MODE OPTICAL COMMUNICATION WITH MODE MIXTURES

This application claims the benefit of provisional applications 61/608,139, 61/669,612, and 61/701,646.

BACKGROUND

Technical Field

The inventions relate to apparatus and methods for multi-mode optical communication.

Discussion of the Related Art

This section introduces aspects that may facilitate a better understanding of the inventions. Accordingly, the statements of this section are to be understood in this light and are not to be understood as admissions about what is prior art or what is not prior art.

In recent years, optical propagation mode-multiplexing has been studied as a method for providing optical communication. In optical propagation mode-multiplexing, a set of orthonormal optical propagating modes of a multi-mode optical fiber carries data between an optical transmitter and an optical receiver. The set includes orthonormal modes with different lateral intensity and/or phase profiles. Since different optical propagating modes may be used to carry different data streams, a multi-mode optical fiber has a potential to support a higher data transmission rate than a single mode optical fiber where the data transmission rate is measured on a per-fiber and a per-wavelength-channel basis.

BRIEF SUMMARY OF SOME EXAMPLE EMBODIMENTS

Embodiments of a first apparatus include an optical transmitter having a plurality of optical data modulators and an end-face coupler. Each of the optical data modulators is configured to output a corresponding data-modulated optical carrier. The optical end-face coupler is configured to direct the data-modulated optical carriers into a pattern of light beams capable of illuminating an end-face of a multi-mode optical fiber with a pattern of light spots. The optical end-face coupler is configured to cause each of the data-modulated optical carriers to excite a set of orthonormal optical propagating modes of the multi-mode optical fiber. Some of the orthonormal optical propagating modes of the set have nontrivially differing intensity and/or phase profiles.

In some embodiments of the first apparatus, the optical coupler may be configured to cause optical power of each of the data-modulated optical carriers to substantially uniformly spread over the orthogonal optical propagating modes of the set. The optical coupler may be configured to cause optical power of one of the data-modulated optical carrier to be spread over the optical propagating modes such that each of the optical propagating modes receives at least ½ as much of the optical power as each other of the optical propagating modes.

In any embodiments of the first apparatus, the optical end-face coupler may be a free-space optical device further including a set of reflectors located and oriented to redirect the data-modulated optical carriers to be substantially parallel.

In alternate embodiments of the first apparatus, the optical end-face coupler may include a tapered fiber bundle having input optical fibers connected to receive the data-modulated optical carriers and an output end capable of illuminating the end-face with the pattern of light spots.

In any embodiments of the first apparatus, the optical end-face coupler may be configured to cause each of the data-modulated carriers to substantially excite, at least, three of the optical propagating mode with different angular momentum eigenvalues.

In any embodiments of the first apparatus, the optical end-face coupler may be configured to produce a pattern of light spots invariant under a group of discrete rotations about the axis of the multi-mode optical fiber. In such an embodiment, the light spots may be in first and second groups such that the light spots of each group form a pattern centered on a center of the end face of the optical fiber. Then, the light spots of the one of the groups are a larger distance from the center of the end-face than the one or more light spots of the other of the groups.

In any embodiments of the first apparatus, the first apparatus may further include an all-optical multi-mode fiber channel having a sequence of all-optically end-connected multi-mode optical fiber spans. The multi-mode optical fiber is a segment of a first of the optical multi-mode fiber spans in the sequence. In some such embodiments, some of the multi-mode fiber spans of the sequence may be hybrid optical fiber spans constructed to provide differential group delay compensation. Some such embodiments may further include an optical receiver configured to evaluate data streams carried by the data-modulated optical carriers by performing MIMO processing on sets of measurements on light received from the all-optical multi-mode fiber channel.

In some embodiments of the first apparatus, the optical end-face coupler may include a 3D waveguide device.

Embodiments of a second apparatus include an optical transmitter that is configured to transmit a plurality of data-modulated optical carriers, in parallel, in a manner that illuminates an end-face of a multi-mode optical fiber with a pattern of light spots. Each of the light spots is formed by a corresponding one of the data-modulated optical carriers. In the pattern, each light spot is relatively located to spread optical power of the corresponding one of the data-modulated optical carriers over a set of orthonormal optical propagating modes having different lateral intensity and/or phase distributions in the multi-mode optical fiber.

In some embodiments of the second apparatus, the light spots of subset have centers that are located on a circle. The light spots of the subset have about equal arc-separations on the circle. In some such embodiments, the subset is formed of an odd number of the light spots, e.g., 3, 5, 7, or 9 of the light spots. The pattern includes one of the light spots located about at a center of the circle. In some embodiments according to this paragraph, a second subset of the light spots includes three or more of the light spots. The light spots of the second subset have centers located along a second circle that is co-centric with the first circle and has a different radius. The two subsets may be formed of different numbers of the light spots.

In any embodiments of the second apparatus, the optical transmitter may transmit power of one of the data-modulated optical carriers such that each optical propagating mode of the set receives at least ½ as much power of one of the data-modulated optical carriers as each other of the optical propagating modes of the set.

In any embodiments of the second apparatus, the optical transmitter may include a tapered fiber bundle connected to receive the data modulated optical carriers on input optical fibers thereof and may be configured to form the pattern by transmitting received light from an end-face thereof.

In any alternate embodiments of the second apparatus, the optical coupler may be a free-space optical device in which reflectors redirect the data-modulated optical carriers to be substantially parallel.

In any embodiments of the second apparatus, the second apparatus may further include a sequence of spans of multi-mode optical fiber serially connected to form an all-optical multi-mode fiber channel. A first of the multi-mode optical fibers of the sequence has an end face positioned to be illuminated by the pattern formed by the optical transmitter. In some such embodiments, the second apparatus may further include an optical receiver being optically connected to receive light emitted by a last of the multi-mode optical fibers of the sequence and may be configured to demodulate a data stream carried by different ones of the optical propagating modes thereof.

In some embodiments of the second apparatus, the optical transmitter may include a 3D waveguide device connected to receive the data modulated optical carriers on input optical fibers thereof and being configured to form the pattern by transmitting received light from an end-face thereof.

BRIEF DESCRIPTION OF THE FIGURES

In the Figures and text like reference numbers indicate functionally and/or structurally similar elements.

In the Figures, the relative dimensions of some features may be exaggerated to more clearly illustrate apparatus therein.

Herein, various embodiments are described more fully by the Figures and the Detailed Description of Illustrative Embodiments. Nevertheless, the inventions may be embodied in various forms and are not limited to the specific embodiments described in the Figures and the Detailed Description of the Illustrative Embodiments.

DESCRIPTION OF THE ILLUSTRATIVE EMBODIMENTS

Above-mentioned provisional patent applications 61/608,139, 61/669,612, and 61/701,646 are incorporated herein by reference in their entirety.

Herein, multi-mode and single-mode optical fibers refer to optical fibers with axially symmetric forms, which carry light in the optical telecommunications C, L and/or S wavelength bands. Examples of such optical fibers may be constructed with doped and/or undoped silica glass optical cores and optical claddings. Some such optical fibers may have step-index or graded-index constructions. Such optical fibers include, e.g., optical fibers with a single step in the radial refractive-index profile and with multiple steps in the refractive-index profile, e.g., such as in depressed-cladding-index optical fibers.

Herein, the multi-mode optical fibers (MMFs) may have different numbers of optical propagating modes. Examples of MMFs include few mode optical fibers (FMFs), which are constructed to have 2 to about 15 optical propagating modes, e.g., in the absence of polarization degeneracies or are constructed to have 4 to about 30 optical propagating modes with polarization degeneracies. Other examples of MMFs include optical fibers having more optical propagating modes.

Herein, relatively orthogonal optical propagating modes of an optical fiber have intensity or amplitude profiles that nontrivially differ. In particular such profiles of two modes nontrivially differ if the modes have amplitude or phase profiles across a cross section of the optical fiber that differ by more than a constant. For example, two such optical propagating modes will typically have different angular momentum eigenvalues or axial radial eigenvalues.

Transmitting a data-modulated optical carrier via a different orthonormal optical propagating mode of a MMF may significantly affect the amount of optical degradation, which the optical transmission causes to the data-modulated optical carrier. Indeed, any or all of optical attenuation, optical cross-talk, and nonlinear optical distortion may be significantly mode-dependent. When each individual data-modulated optical carrier is transmitted on corresponding and relatively orthogonal optical propagating modes, the mode-dependency of the optical degradation during optical transmission may be large enough for some of the data-modulated optical carriers become too degraded for demodulation at an optical receiver.

The inventors believe that the above-described undesired effect of mode-dependency may be reduced by optically transmitting each data-modulated optical carrier via a set of orthonormal optical propagating modes of the MMF instead via a single optical propagating mode. The set would include two or more relatively orthogonal optical propagating modes of the MMF, and two or more relatively orthonormal optical propagating modes of the set have phase and/or intensity profiles that differ by more than a constant. In particular, the inventors believe that substantially spreading each individual data-modulated optical carrier over a set of relatively orthogonal optical propagating-modes, e.g., two or more such modes with nontrivially differing intensity and/or phase profiles, may cause optical transmission to produce a beneficial averaging of optical degradation. Such averaging may lower the dependency of the optical degradation on the data-modulated optical carrier. Reducing this dependency may also facilitate equalization and/or multiple-input-multiple-output (MIMO) processing of received streams of light signals at an optical receiver.

Also, substantially spreading the optical power of an individual data-modulated optical carrier over a preselected set of such a set of relatively orthogonal optical propagating modes may reduce optical insertion losses. Some optical couplers that substantially uniformly spread the optical power of such a data-modulated optical carrier over such a preselected set of optical propagating modes of an MMF can insert the optical carrier into an end-face of a MMF with very low optical insertion losses.

Figure 1:
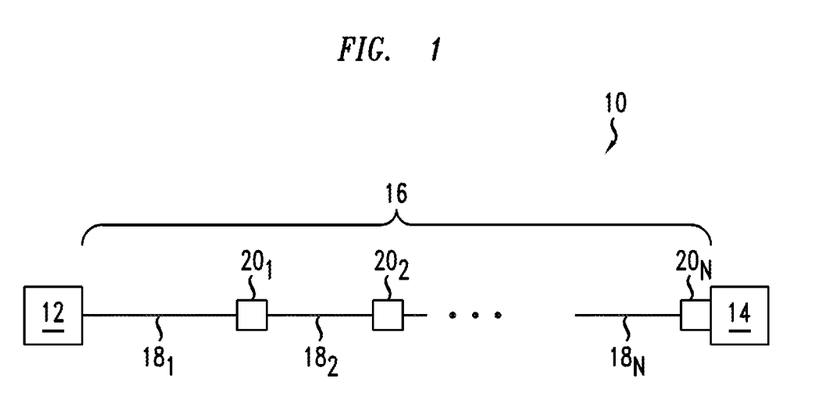
FIG. 1 is a block diagram illustrating an optical communication system having a sequence of transmission spans of multi-mode optical fiber (MMF)

FIG. 1 illustrates an optical communication system 10, which substantially spreads the optical power of each individual data-modulated optical carrier over optical propagating modes of a preselected set. The preselected set has orthonormal propagating modes whose intensity and/or phase profiles differ by more than a constant, e.g., the set may include modes with different radial and/or angular momentum eigenvalues. The optical communication system 10 includes an optical transmitter 12, an optical receiver 14, and an all-optical multi-mode fiber channel 16 optically connecting the optical receiver 14 to the optical transmitter 12.

The optical transmitter 12 excites a preselected set of M relatively orthogonal spatial optical propagating modes of the all-optical multi-mode fiber channel 16 with each initial data-modulated optical carrier of a set. The set of initial data-modulated optical carriers consists of M or less optical carriers, which are modulated with separate digital-data streams. The optical transmitter 12 may, e.g., excite each of the M optical propagating modes, in parallel, with the initial data-modulated optical carriers of the set. In particular, the optical transmitter 12 produces linearly independent optical couplings between the initial data-modulated optical carriers of the set and the M spatial optical propagating modes of the all-optical multi-mode fiber channel 16. Due to the linear independency of the optical couplings, the separate digital data streams, which are modulated onto the separate initial data-modulated optical carriers, may be recovered at the optical receiver 14, e.g., via MIMO processing and/or equalization methods.

In some embodiments, the optical transmitter 12 may spread the energy of an initial data-modulated optical carrier substantially uniformly over the relatively orthogonal spatial optical propagation modes of the preselected set. The preselected set includes orthonormal optical propagating modes whose intensity and/or phase profiles differ by more than a constant, e.g., optical propagating modes with different radial and/or angular momentum eigenvalues. For example, the optical transmitter 12 may be configured such that the initial data-modulated optical carrier excites different ones of the M spatial optical propagating modes of the all-optical multi-mode fiber channel 16 to have energies that vary over the preselected set, e.g., by 3 or less decibels, by 2 or less decibels, or even by 1 or less decibels. If the various initial data-modulated optical carriers are transmitted by the optical transmitter 12 with such substantially uniform mode-spreading, different ones of the initial data-modulated optical carriers may be subjected to similar amounts of optical degradation during transmission over the all-optical multi-mode fiber channel 16.

Herein, the preselected set of optical propagating modes of an MMF to which an optical transmitter spreads the light of a data-modulated optical carrier may or may not be a complete set of optical propagating modes of an optical fiber. That is, the preselected set includes a plurality of relatively orthogonal modes, but the modes of such a set may or may not form a complete basis for one polarization or both polarizations of modes in the MMF. Each preselected set includes, at least, 3 relatively orthogonal optical propagating modes of the MMF, which have nontrivially different intensity and/or phase profiles.

In some embodiments, the optical transmitter 12 may incorporate wavelength-multiplexing. In such embodiments, the optical transmitter 12 may, e.g., perform mode-spreading of the initial data-modulated optical carriers on a wavelength-channel-by-wavelength-channel basis.

The optical receiver 14 may selectively or separately detect sequences of light values received from the M individual optical propagating modes of preselected set excited by the optical transmitter 12. For example, the optical receiver 14 may be configured to selectively or separately detect light received from individual spatial optical propagating modes as described in either of U.S. Patent Application Publication No. 20110243490 and U.S. Patent Application Publication No. 20110243574, which are both incorporated by reference herein in their entirety.

In addition, the optical receiver 14 may evaluate the initial digital data streams, which were modulated onto the optical carriers by the optical transmitter 12, based on parallel measurements of light values received from individual ones of the relatively orthogonal spatial optical propagation modes of the preselected set. In the optical receiver 14, the evaluation of the initial digital data streams may involve performing conventional MIMO processing and/or equalization of the parallel measured streams of light values. In some embodiments, the optical receiver 14 may also perform differential group velocity compensation prior to performing such MIMO processing and/or equalization. The MIMO processing and/or equalization may, e.g., approximately diagonalize the product of the channel matrix for the preselected set of optical propagating modes and the optical coupling matrix of the optical transmitter 12. The optical coupling matrix defines the couplings between the set of initial data-modulated optical carriers and the M spatial optical propagating modes of the preselected set.

The all-optical multi-mode fiber channel 16 includes a sequence N optical transmission span(s) $18_1, 18_2, \ldots, 18_N$ of MMF and (N−1) optical processing units $20_1, \ldots, 20_{N-1}$ that optically end-connect physically adjacent ends of the transmission spans $18_1$-$18_N$. The number N may be any integer that is equal to or greater than one. Each optical transmission span $18_1$-$18_N$ may be, e.g., the same type of MMF so that the N optical transmission spans $18_1$-$18_N$ have orthonormal sets of the same or similar spatial optical propagating modes.

The optical transmission spans $18_1$-$18_N$ may be formed by segments of conventional MMFs. Each segment may be, e.g., a single segment of a conventional step-index MMFs, conventional graded index MMFs, or conventional depressed cladding-index MMFs.

Alternately, one or more of the optical transmission spans $18_1$-$18_N$ may be formed by segments of hybrid MMF, e.g., segments of MMF formed of end-fused segments of different types of MMF. Indeed, such hybrid MMFs may be constructed to reduce or substantially compensate accumulated differential group delays (DGD) between the different optical propagating modes of the preselected set, e.g., on a span-by-span basis. The use of such hybrid MMF spans, which provide such DGD compensation, may facilitate MIMO processing and/or equalization in the optical receiver 14.

In some embodiments, each optical transmission span $18_1$-$18_N$ has only a few spatial optical propagating modes, i.e., is a few-mode optical fiber. The number of orthogonal spatial optical propagating modes of the sequence of optical transmission spans $18_1$-$18_N$ is equal to or greater than the number of relatively orthogonal optical propagating modes in the preselected set that optically carries data.

The optical processing units $20_1$-$20_{N-1}$ may perform one or more of optical amplification, optical dispersion compensation, and cumulative DGD compensation between the optical propagating modes of the preselected set. In some embodiments, an optional last optical processing unit $20_N$ may be used to reduce or remove any residual DGD between the optical propagating modes of the preselected set and/or to provide amplification, and/or reduce or remove residual dispersion of optical propagating modes.

The individual optical transmission span(s) $18_1$-$18_N$ of MMF and the all-optical processing unit(s) $20_1$-$20_N$ may have any suitable form, e.g., conventional forms known to persons of ordinary skill in the relevant art. The individual optical transmission span(s) $18_1$-$18_N$ and/or all-optical processing unit(s) $20_1$-$20_N$ may be constructed, e.g., as described in U.S. patent application Ser. No. 13/539,371, filed on Jun. 30, 2012. Some of the all-optical processing unit(s) $20_1$-$20_N$ may include multi-mode optical amplifiers as described in U.S. patent application Ser. No. 13/632,038, filed Sep. 30, 2012 and/or U.S. provisional patent application No. 61/692,735, filed Aug. 24, 2012. The applications recited in this paragraph are incorporated herein by reference in their entirety.

In some embodiments, the optical transmitter 12 and/or optical receiver 14 may incorporate wavelength-multiplexing. In such embodiments, the optical transmitter 12 may perform, e.g., the optical mode-spreading, as already described, on a wavelength-channel-by-wavelength-channel basis. Similarly, for one or more wavelength-channels, the optical receiver 14 may be configured to evaluate the individual data streams, which were modulated onto optical carriers in the optical transmitter 12, as already described, on a wavelength-channel-by-wavelength-channel basis.

Figure 2:
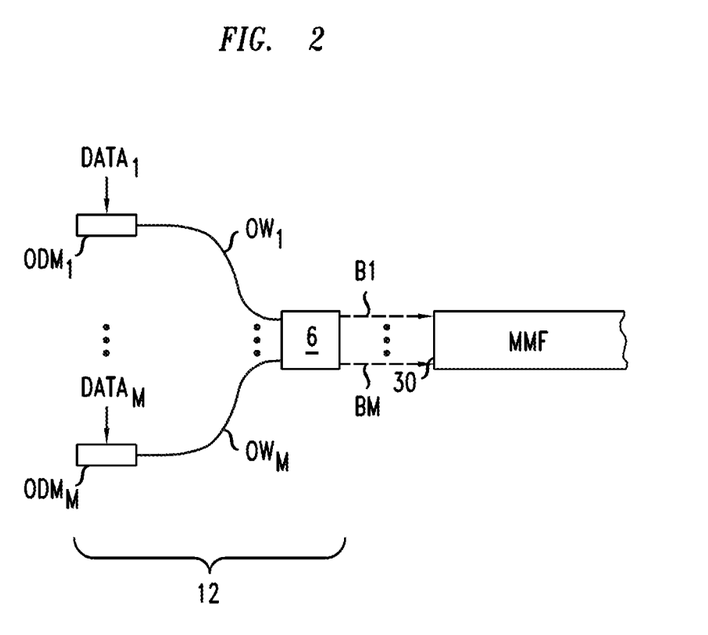
FIG. 2 is a block diagram schematically illustrating the optical transmitter of FIG. 1.

FIG. 2 illustrates the optical transmitter 12 of FIG. 1. The optical transmitter 12 includes M optical data modulators $ODM_1, \ldots, ODM_M$, M optical waveguides $OW_1, \ldots, OW_M$ and an optical end-face coupler 6. Each optical data modulator $ODM_1$-$ODM_M$ outputs an optical carrier modulated by a electrical digital data stream $DATA_1$-$DATA_M$, which is received at the optical data modulator $ODM_1$-$ODM_M$. Each optical waveguide $OW_1$-$OW_M$ optically couples a corresponding one of the optical data modulators $ODM_1$-$ODM_M$ to the optical end-face coupler 6. The optical end-face coupler 6 optically couples the M optical waveguides $OW_1$-$OW_M$ to an adjacent and nearby end-face 30 of an MMF, e.g., the MMF of the first optical transmission span $18_1$ in FIG. 1.

The optical end-face coupler 6 produces a corresponding light spot on the adjacent and nearby end-face from the light beam emitted by each optical waveguides $OW_1$-$OW_M$. For example, the optical end-face coupler 6 may include a set of free space optical devices arranged to produce said light spots, e.g., reflector(s), aperture(s), and focusing and/or collimating lens and/or mirror systems. The light spots produced from the different optical waveguides $OW_1$-$OW_M$ often have centers, which are spatially separated on the adjacent end-face 30 of the MMF 30. For some embodiments of the optical end-face coupler 6, the light spots are completed or substantially completely separated on the end-face 30. In such embodiments, the optical end-face coupler 6 typically produces M separate light spots on the adjacent end-face 30 of the MMF. In other embodiments, the optical end-face coupler 6 may produce a pattern of spatially overlapping light spots, e.g., lighted regions. In various embodiments, different ones of the individual light spots of the pattern couple to linearly independent combinations of the optical propagating modes of the preselected set for the MMF.

On the adjacent end-face 30 of the MMF, each pattern of light spots defines an optical coupling between the corresponding optical waveguide $OW_1$-$OW_M$ and the optical propagating modes of the preselected set for the MMF. In particular, the optical end-face coupler 6 may spread the optical energy or power of each initial data-modulated optical carrier, i.e., from one of the optical waveguides $OW_1$-$OW_M$, substantially uniformly to the spatial optical propagation modes of the preselected set. The preselected set includes orthonormal optical propagating modes whose intensity and/or phase profiles differ by more than a constant value, e.g., the set may include modes with different radial eigenvalues and/or angular momentum eigenvalues. That is, each initial data-modulated optical carrier is transported in the MMF by a mixture of optical propagating modes. For example, the optical end-face coupler 6 may be configured such that each of the M initial data-modulated optical carriers, from the optical modulators $ODM_1$-$ODM_M$, excites M relatively orthogonal spatial optical propagating modes for the MMF with optical powers that vary over the modes of the preselected set by 3 or less decibels, by 2 or less decibels, or even by 1 or less decibels.

Thus, the light from each optical waveguide $OW_1$-$OW_M$ substantially couples to a preselected set of the multiple optical propagating modes of the MMF, i.e., couples to a mixture of optical propagating modes. The optical couplings define an optical coupling matrix between the initial data-modulated optical carriers, which are produced by the optical data modulators $ODM_1$-$ODM_M$, and the optical propagating modes of the preselected set for the MMF. This optical coupling matrix is typically invertible and approximately unitary.

Figure 3:
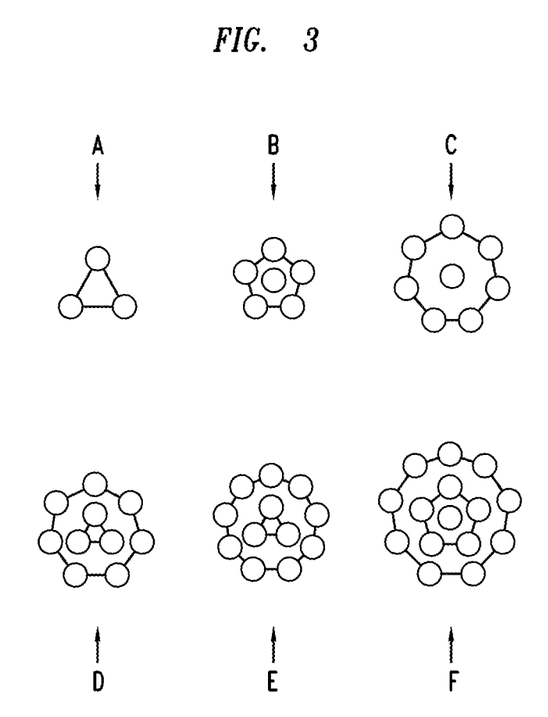
FIG. 3 illustrates examples of patterns of light spots that embodiments of the optical transmitter of FIG. 2 form on a end-face of the MMF of the first transmission span in an optical multi-mode fiber communication channel, e.g., the optical fiber communication channel of FIG. 1.

FIG. 3 illustrates examples of patterns of light spots that alternate embodiments of the optical transmitter 12 may form on the end-face 30 of the MMF in FIG. 2. Different embodiments of the optical transmitter 12 may optically couple the set of initial data modulated optical carriers to a different preselected set of optical propagating modes of the MMF of FIG. 2. In addition, various embodiments of the optic transmitter 12 may substantially uniformly spread the optical power of an individual one of the initial data modulated optical carriers of the set over the optical propagating modes of the preselected set. In particular, each light spot of a pattern may excite optical powers that vary over the optical propagating modes of the preselected set, e.g., by 3 or less decibels, by 2 or less decibels, or even by 1 or less decibels. Each preselected set includes orthonormal optical propagating modes whose intensity and/or phase profiles differ in a nontrivial manner, e.g., the preselected set may include modes with different radial eigenvalues and/or angular momentum eigenvalues.

FIG. 3 shows alternate patterns A, B, C, D, and E, which have 3, 6, 8, 10, 12, and 15 spatially separated light spots, respectively. In each pattern A-F, the light spots are indicated by filled circles. In FIG. 3, the lines connecting some of the light spots are not part of the patterns A-F. The lines are included to aid visualization of the forms of the various patterns A-F.

For appropriate forms of the MMF of FIG. 2, the individual light spots of each pattern A-F excite a preselected set of linear polarized (LP) modes, which approximate optical propagating modes of the MMF is a step-index fiber with a small optical core-optical cladding index difference. In each pattern A-F, the number of light spots is equal to or greater than the number of independent combinations of optical propagating modes that the set of light spots can excite. The individual light spots of the patterns A-F having 3, 6, 10, 12, and 15 light spots, respectively, may, e.g., excite the following respective preselected sets of LP modes:

$\{LP_{01}, LP_{11\,a}, LP_{11\,b}\}$,
$\{LP_{01}, LP_{02}, LP_{11\,a}, LP_{11\,b}, LP_{21\,a}, LP_{21\,b}\}$,
$\{LP_{01}, LP_{02}, LP_{11\,a}, LP_{11\,b}, LP_{21\,a}, LP_{21\,b}, LP_{31\,a}, LP_{31\,b}\}$,
$\{LP_{01}, LP_{02}, LP_{11\,a}, LP_{11\,b}, LP_{21\,a}, LP_{21\,b}, LP_{31\,a}, LP_{31\,b}, LP_{12\,a}, LP_{12\,b}\}$,
$\{LP_{01}, LP_{02}, LP_{11\,a}, LP_{11\,b}, LP_{21\,a}, LP_{21\,b}, LP_{31\,a}, LP_{31\,b}, LP_{41\,a}, LP_{41\,b}, LP_{12\,a}, LP_{12\,b}\}$, and $\{LP01, LP_{02}, LP_{03}, LP_{11\,a}, LP_{11\,b}, LP_{21\,a}, LP_{21\,b}, LP_{31\,a}, LP_{31\,b}, LP_{41\,a}, LP_{41\,b}, LP_{12\,a}, LP_{12b}, LP_{22a}, LP_{22b}\}$.

In each pattern, the light spots are symmetrically or regularly arranged on one or more rings centered on the axis of the MMF. Some non-limiting examples of such arrangements are shown in FIG. 3. In a pattern, the number of rings is given by the number of different radial quantum number "n" for the preselected set of $LP_{mn}$ modes. The multi-ring patterns can excite linearly independent combinations of radial $LP_{mn}$ modes.

To substantially uniformly spread the power of an optical carrier over the LP modes of a preselected set, a light spot, which is formed by the optical carrier on the end-face 30 of the MMF of FIG. 2, should have appropriate position, size, and shape on the end-face 30. For such a light spot, the inventors believe that preferred values of the position, size, and shape should cause low mode-dependent losses in the optical end-face coupler 6 of FIG. 2 and/or low insertion loss. The inventors believe that low mode-dependency in such losses can enhance the ability of MIMO processing to recover the data streams modulated onto the optical carriers prior to transmission to the MMF.

The optical end-face coupler 6 defines an effective coupling matrix M between light spots projected onto the end-face 30 of the MMF by the optical end-face coupler 6 of FIG. 2 and the optical propagating modes in the MMF. In the matrix M, each matrix element is given by an overlap integral between the electric fields of the light spot and the optical propagating mode corresponding to the element. Typically, the matrix M may be decomposed into the form $M=U\Lambda V\dagger$ where U and V are unitary matrices, and $\Lambda$ is a diagonal matrix whose nonzero diagonal entries are the eigenvalues of M. The inventors believe that a preferred embodiment of the optical end-face coupler 6 of FIG. 2 has an effective coupling matrix M for which the corresponding matrix $\Lambda$ has nonzero diagonal entries whose ratios have magnitudes close to 1. Such preferred embodiments of the optical end-face coupler 6 could be easily found by a person of ordinary skill in the relevant arts without undue experimentation based on the disclosure of the present application.

Figure 4:
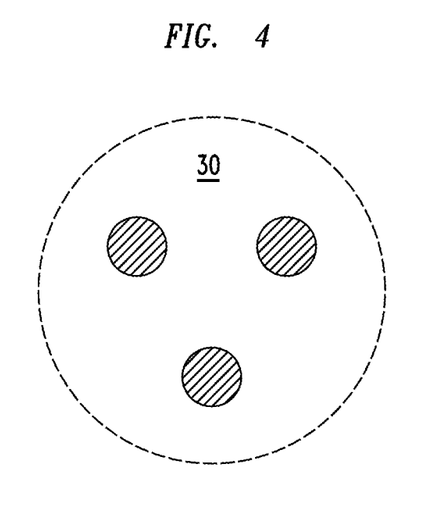
FIG. 4 shows a pattern of 3 light spots that some embodiment of the optical transmitter of FIG. 1 may use, e.g., to substantially uniformly spread the optical power of 3 individual data-modulated optical carriers over 3 linearly polarized (LP) modes of an MMF, e.g., over LP modes having the angular momentum eigenvalues 0, +1, and −1.
Figure 5:
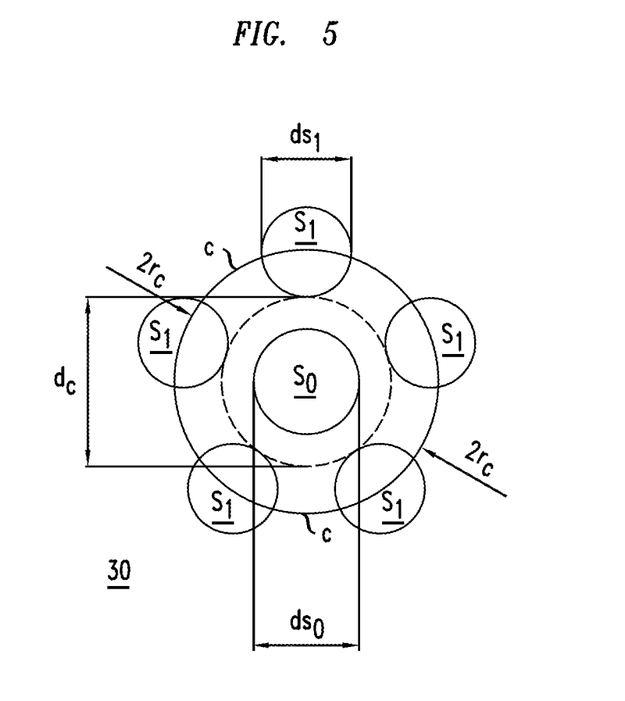
FIG. 5 shows a pattern of 6 light spots that some embodiments of the optical transmitter of FIG. 1 may use, e.g., to substantially uniformly spread the optical power of individual data-modulated optical carriers over 6 LP modes of an MMF.

FIGS. 4 and 5 illustrate examples of 3-light-spot and 6-light-spot patterns, which may be implemented by some embodiments of the optical end-face coupler 6 of FIG. 2. In these examples, the individual light spots of patterns can substantially uniformly spread the optical power therein over the LP mode sets $\{LP_{01}, LP_{11\,a}, LP_{11\,b}\}$ and $\{LP_{01}, LP_{02}, LP_{11\,a}, LP_{11\,b}, LP_{21\,a}, LP_{21\,b}\}$, respectively, for suitable forms of the MMF of FIG. 2. In particular, the optical end-face couplers that produce these patterns on the end-face 30 of suitable MMFs can provide an effective coupling matrix M, which is substantially unitary and has eigenvalues whose ratios have magnitudes close to 1.

Example Pattern of 3 Light Spots

FIG. 4 shows a pattern in which 3 light spots of about equal size and shape are symmetrically or regularly arranged about the center of the end-face 30 of the MMF in FIG. 2. In particular, the centers of the different light spots are interchanged by rotations of 120 degrees about the center of the end-face 30. In addition, each light spot may have an approximately Gaussian intensity profile and a circular shape.

In the pattern, each light of the 3 lights spots is located at the same radial distance from the center of the end-face 30 of the optical fiber of FIG. 2. The radial distance is selected to cause each light spot to excite the $LP_{01}$ mode of the MMF and the $LP_{11a}+iLP_{11b}$ mode of the MMF with about equal powers. Here, the $LP_{11a}+iLP_{11\,b}$ and $LP_{11a}-iLP_{11\,b}$ mode are angular momentum eigenstates in the MMF, i.e., modes whose intensities are axially symmetric about the axis of the MMF. From the above requirement, a person of ordinary skill in the relevant arts would be able to easily determine the radial distance of such light spots from the center of the MMF of FIG. 2. Indeed, such person of ordinary skill would understand that the relative strengths of the couplings of such light spots to the $LP_{01}$ mode and to the $LP_{11a}+iLP_{11\,b}$ mode depends on said radial distance, because the $LP_{01}$ mode typically has its highest light intensity on the axis of the MMF, and the $LP_{11a}+iLP_{11\,b}$ typically has its highest light intensity at a nonzero radial distance from the axis of the MMF.

In the above pattern, each light spot may also have a size that is configured to produce low insertion losses. For an example MMF, which is a step-index few-mode fiber or graded-index few mode fiber, e.g., having only approximate $LP_{01}$, $LP_{11a}$, and $LP_{11\,b}$ modes, each light spot may have a diameter of about the mode-field diameter in a standard single mode fiber provided that the optical core of the MMF has a diameter of about 17 micro-meters and that the MMF has a normalized frequency of V=3.92. The mode field diameters are typically related to the square root of the effective areas of the MMF when the MMF is a few mode optical fiber.

Using the pattern of 3 light spots to couple the initial data-modulated carriers of the optical transmitter 12 of FIG. 1 to the all-optical multi-mode fiber channel 16 thereof may provide an advantage. In particular, 3 light spots can couple to a set of optical propagating modes with only 2 group velocities in the all-optical multi-mode fiber channel 16. For example, in the set $\{LP_{01}, LP_{11a}, LP_{11b}\}$, the $LP_{11a}$ and $LP_{11\,b}$ modes typically have the same instantaneous group velocity so that the set of optical propagating modes only propagate with 2 different group velocities. For this reason, differential group delay (DGD) compensation may be available on a span-by-span basis by forming the individual MMFs of hybrid optical fiber. For example, such a hybrid fiber span may have first and second MMF segments in which the dispersion has opposite signs. The use of such hybrid MMF spans to provide DGD compensation may aid in MIMO processing of received optical signals at the optical receiver 14 of FIG. 1.

Example Pattern of 6 Light Spots

FIG. 5 schematically illustrates an example of a pattern of 6 light spots $S_0$, $S_1$, $S_2$, $S_3$, $S_4$, $S_5$, which are arranged about the center of the end-face 30 of the MMF in FIG. 2. The pattern of light spots $S_0$-$S_5$ may provide optical couplings for up to 6 separate initial data-modulated optical carriers onto 6 optical propagating modes of a few-mode optical fiber (FMF) with LP-like optical propagating modes. Such an FMF may have 12 relatively orthonormal LP modes when both polarizations are included. As an example, such an FMF may have, e.g., an optical core with a diameter of about 17 micro-meters (μm) and an optical core-to-cladding refractive index contrast of about 0.5%.

In the pattern, the central light spot $S_0$ has a diameter $ds_0$, and the 5 outer light spots $S_0$ have a diameter $ds_1$. The 5 outer light spots $S_1$ are located at approximately equal arc-separations along an imaginary circle C of radius $r_c$, wherein the imaginary circle C is about centered on the center of the end-face 30. The outer light spots $S_1$ touch a cut-out circular region whose diameter is dc. The cut-out circular region is also centered on the central light spot $S_0$.

In the pattern, each light spot $S_0$-$S_5$ may have, e.g., an approximately Gaussian intensity profile and a circular shape.

The pattern of the light spots $S_0$-$S_5$ may be designed to reduce coupling insertion losses and/or mode-dependencies of losses in the optical mode-coupler 6 of FIG. 2 by selecting suitable values for the parameters $ds_1$, $r_c$, $ds_0$, and/or dc. As an example, for coupling to the above-described MMF, the optical mode-coupler 6 can be formed with a coupling insertion loss of about 3 dB and a mode-dependency of the losses of about 1 dB if $ds_1$ is set to be about 5.5 μm, $r_c$ is set to be about 6.6 μm, $ds_0$ is set to be about 5.1 μm, and dc is set to be about 6.6 μm. The mode-dependency of the coupling insertion loss can be further mitigated if the optical propagating modes undergo substantial mixing along the length of the FMF.

Such patterns of 6 light spots for the optical mode-coupler 6 of FIG. 2 may be made using free-space optics, e.g., based on structures similar to those illustrated below in FIGS. 6A-6B, a tapered optical fiber bundle or photonic lantern, an integrated optical device, or a 3D waveguide device. In such an embodiment of the optical mode-coupler 4, which is based on free-space optics, the initial data-modulated light beams may be spatially combined to form the pattern of 6 light spots, e.g., using a pyramidal mirror device having a pentagonal or other basis. The central hole along the main axis of the pyramidal mirror device may be used to produce the central light spot $S_0$ of the pattern. In an embodiment of the optical mode-coupler t based on a tapered fiber bundle or a photonic lantern, tapered portions of the six single mode optical fibers thereof could form a cross-sectional pattern in the fused and tapered structure FTS, which is similar in form to the pattern of FIG. 5.

Example Optical Transmitters with 3-Spot Mode-Couplers

Figure 6A:
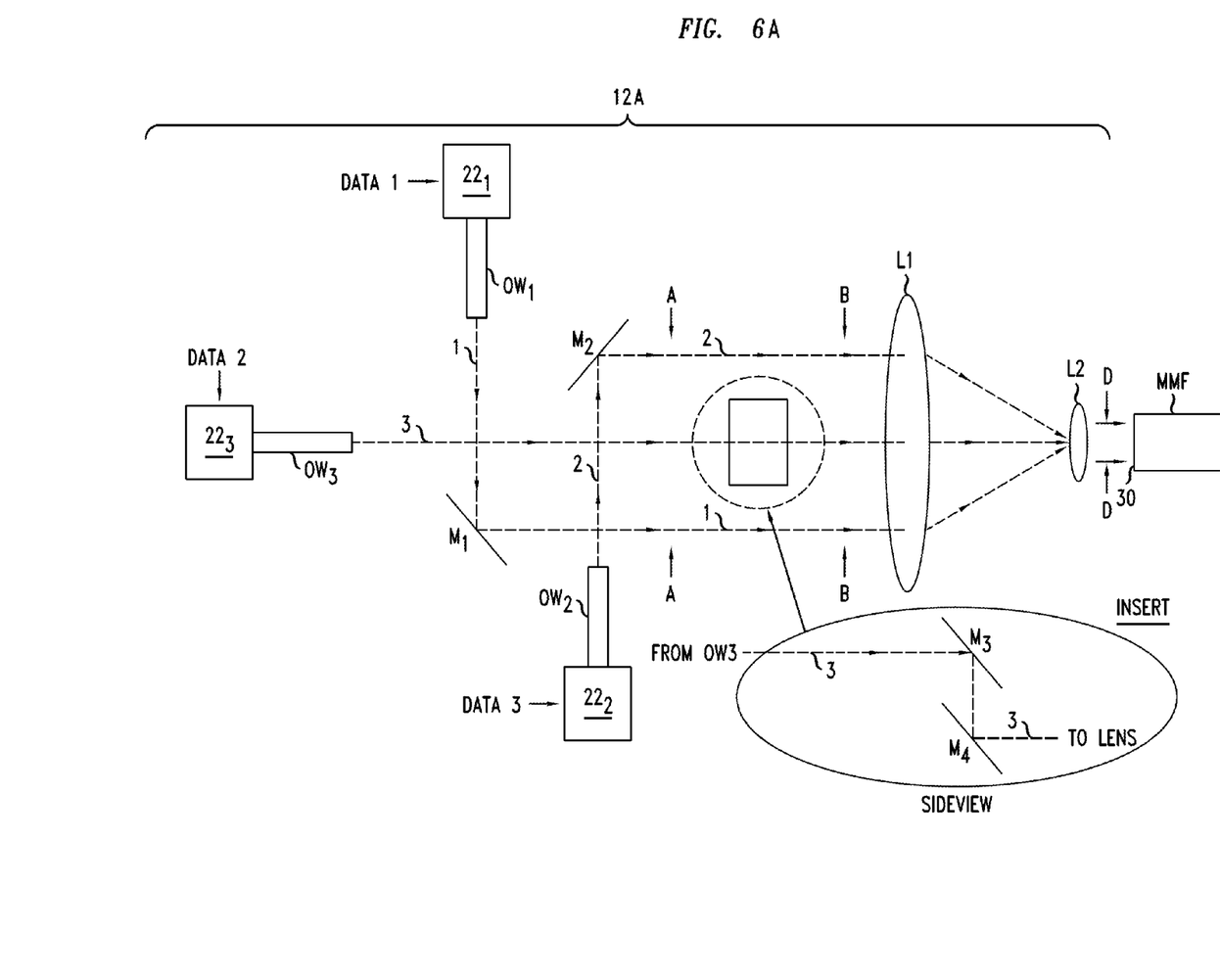
FIG. 6A is a block diagram illustrating an embodiment of the optical transmitter of FIG. 2 in which an optical end-face coupler spreads 3 separate data-modulated optical carriers over mixtures of orthonormal optical propagating modes of an MFA based on the pattern of light spots of FIG. 4.
Figure 6B:
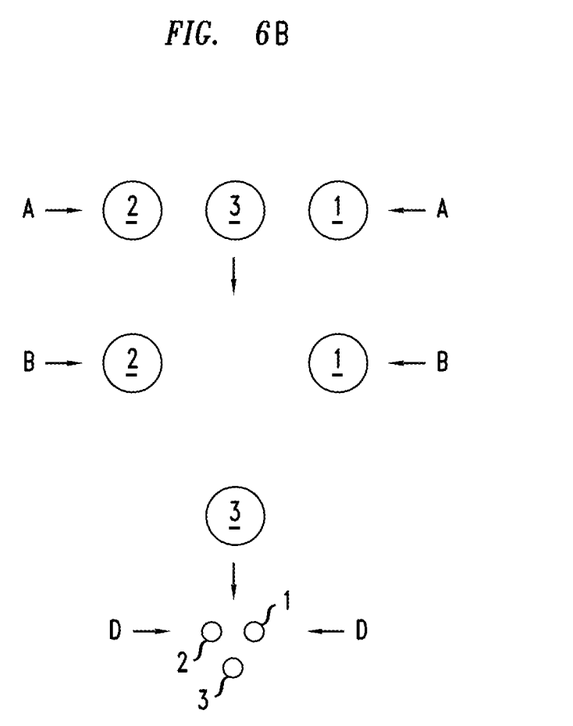
FIG. 6B has a series of cross-sectional views that illustrate the evolution of the pattern of cross sections of the 3 data-modulated optical carriers in a free-space version of the optical end-face coupler of FIG. 6A.

FIGS. 6A-6B illustrate an example 12A of the optical transmitter 12 of FIG. 2, which produces the 3-spot pattern of FIG. 4 on the nearby end-face 30 of the MMF of FIG. 2. The optical transmitter 12A uses free-space optics to construct the optical end-face coupler 6 of FIG. 2.

Referring to FIG. 6A, the optical transmitter 12A includes three optical data modulators $22_1$, $22_2$, $22_3$; three optical waveguides $OW_1$, $OW_2$, $OW_3$; mirrors M1, M2, M3, M4; and a focusing and/or collimating lens system including lenses L1, L2.

Each optical modulator $22_1$, $22_2$, $22_3$ modulates a received initial electrical digital data stream DATA-1, DATA-2, DATA-3 onto a corresponding optical carrier and outputs the resulting initial data-modulated optical carrier to a corresponding optical waveguide $OW_1$, $OW_2$, $OW_3$. Each optical waveguide $OW_1$, $OW_2$, $OW_3$, which may be, e.g., a single mode optical-fiber or a planar optical waveguide, transmits the initial data-modulated optical carrier via an output end thereof to a mirror M1, M2, M3.

The mirrors M1, M2, M3, M4 couple the initial data-modulated optical carriers to the nearby end-face of the MMF of FIG. 2. The three mirrors M1, M2, M3 rearrange the pattern formed by cross sections of the light beams of the initial data-modulated optical carriers 1, 2, 3. These light beams are originally emitted, in a co-planar manner, from the ends of the optical waveguides $OW_1$, $OW_2$, $OW_3$.

The two mirrors M1, M2 redirect two of these light beams so that the light beams of the three data-modulated optical carriers 1, 2, 3 are both coplanar and parallel in region AA of FIG. 6A. This coplanar and parallel arrangement of the light beams of the initial digital-data modulated optical carriers 1, 2, 3 is illustrated, in cross section, at the upper portion of FIG. 6B.

Next, the remaining mirrors M3, M4 laterally displace the light beam of the central initial digital-data modulated optical carrier 3 to be located above or below the plane of the light beams of the other two co-directed initial digital-data modulated optical carriers 1, 2 in region BB of FIG. 6A. This new arrangement of the light beams of the initial digital-data modulated optical carriers 1, 2, 3 is illustrated in the middle portion of FIG. 6B. These remaining mirrors M3, M4 may be vertically arranged as illustrated in the insert to FIG. 6A.

The lenses L1 and L2 re-size of the pattern of light beams, which the mirrors M1-M4 produce, so that the pattern has a size suitable for illuminating the end-face 30 of the MMF in FIG. 2. For example, the lens L1 may de-magnify the cross-sectional pattern of the three initial digital-data modulated optical carriers 1, 2, 3 from the BB region to produce a smaller diameter beam-arrangement. Then, the lens L2 may collimate the three initial digital-data modulated optical carriers 1, 2, 3 to form a three-spot configuration of light from said three light beams on the end-face 30 of the MMF. This new arrangement of the light beams of the initial digital-data modulated optical carriers 1, 2, 3 is illustrated in the bottom portion of FIG. 6B.

Example Optical Transmitters Based on Fiber Devices

In other embodiments, the optical waveguides $OW_1$-$OW_M$ and optical end-face coupler 6 of FIG. 2 may be formed of an optical fiber device, e.g., a tapered fiber bundle in which each input optical fiber carries one of the initial data-modulated optical carriers. In the fiber bundle, the individual optical fibers may be laterally arranged in the fused and tapered section (FTS) of the fiber bundle according to one of the spot patterns already discussed, e.g., one of the patterns of FIGS. 3-5.

In some such embodiments, the optical fiber device may be a photonic lantern that adiabatically merges M single-mode fibers $SMF_1$, ..., $SMF_M$ in the fused and tapered optical segment (FTS) where the array of original optical fiber cores is surrounded by an optical cladding matrix of lower refractive index.

Figure 7:
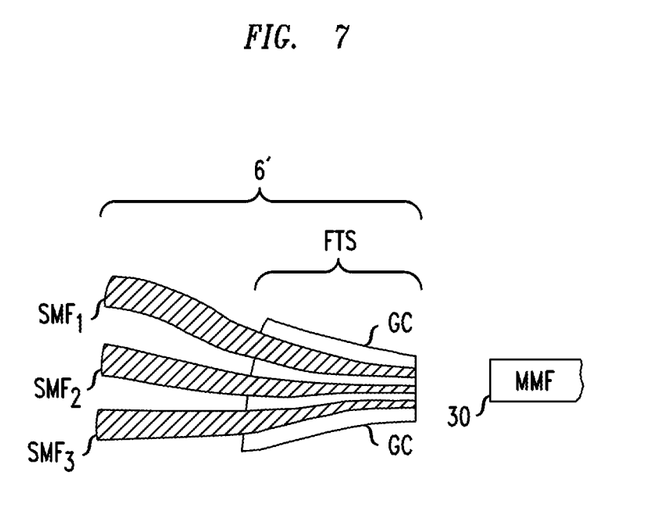
FIG. 7 is a cross-sectional view of a tapered fiber bundle embodiment of the optical end-face coupler of FIG. 2.

FIG. 7 schematically illustrates an example of such a photonic lantern 6' with M input single-mode optical fibers $SMF_1, \ldots, SMF_M$, i.e., for the case of M=3. To form the fused and tapered segment FTS of the photonic lantern 6', a segment of each original single mode fibers $SMF_1$-$SMF_M$ may be placed in a single glass capillary GC with a lower refractive index. Then, the fiber-filled glass capillary may be fused and pulled to produce the adiabatic tapering of the FTS segment. Due to the adiabatic tapering, the light pattern of the M isolated single mode optical cores may evolve into a new beam pattern in the tapered and fused segment FTS without power loss. Due to the adiabatic tapering, an original pattern of M localized beams may evolve into the FTS segment to a pattern of laterally overlapping beams, which may produce a pattern of overlapping lighted regions on the end-face of the MMF as discussed elsewhere in this application. A photonic lantern based embodiment of the optical mode-coupler 6 of FIG. 2 may provide a low mode-dependent loss and/or a low coupling/insertion loss, e.g., when the tapering does not cause light of the original propagating modes of the M single mode fibers to evolve into optical cladding modes of the fused and tapered optical segment FTS.

Example Optical Transmitters Based on Integrated Devices

Alternatively, the optical waveguides $OW_1$-$OW_M$ and the optical mode-coupler 6 of FIG. 2 may be implemented using a planar optical device that is configured to produce the desired light spot pattern from M initial data-modulated optical carriers.

Example Optical Transmitter Based on 3D Waveguide Device

Figure 8:
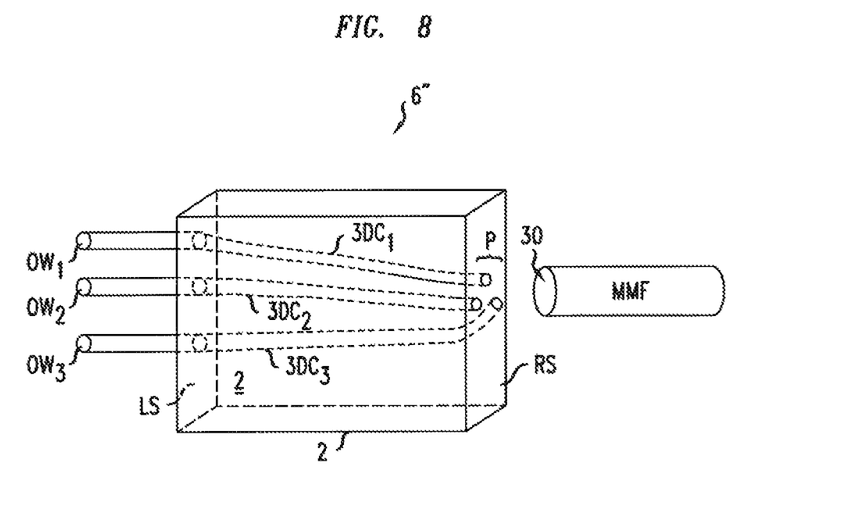
FIG. 8 is an oblique view of a three-dimensional (3D) waveguide device, which is an embodiment of the optical end-face coupler of FIG. 2.

FIG. 8 illustrates a 3D waveguide device 6", which provides an embodiment of the optical end-face coupler 6 of FIG. 2. The 3D waveguide device 6" is configured to produce a pattern of 3 light spots on the nearby end-face 30 of the MMF of FIG. 2. The 3D waveguide device 6" includes 3 optical cores $3DC_1$, $3DC_3$, $3DC_3$ formed in a volume of a block 2 of optical material, e.g., a silica glass block. Between the left side (LS) of the block 2 and the right side (RS) of the block 2, the cross-sectional pattern, which is formed by the optical cores $3DC_1$, $3DC_3$, $3DC_3$ smoothly evolves. On the left side (LS) of the block 2, the optical cores $3DC_1$-$3DC_3$ of the pattern are widely spaced as is convenient for end-coupling to the optical waveguides $OW_1$, $OW_2$, $OW_3$, which connect to the 3 optical data modulators (not shown). On the right side (RS) of the block 2, the optical cores $3DC_1$-$3DC_3$ have a spatial pattern (SP) that is of the form of the pattern of light spots, which is to be projected on the nearby end-face 30 of the MMF.

The evolution of the cross-sectional pattern of the optical cores $3DC_1$-$3DC_3$ is produced by forming the optical cores $3DC_1$-$3DC_3$ in the bulk volume of the block 2. In particular, the 3D waveguide device may be inscribed in a block of optical material with a focused and high intensity laser. For example, femto-second pulsed, high intensity lasers can be operated to produce focused light beams capable of laser writing such complex patterns of optical cores in the volume of a 3D silica glass block. Services to produce such 3D waveguide devices via 3D micro-manufacture laser writing are publicly available, e.g., such services and 3D waveguide devices are publicly available from Optoscribe Ltd., 0/14 Alba Innovation Centre, Alba Campus, Livingston, West Lothian, Scotland EH54 7GA.

Whereas the illustrated optical end-face coupler 6 is configured to produce a pattern of 3 light spots on the nearby end-face 30 of the MMF, 3D waveguide devices for the optical end-face coupler 6 of FIG. 2 are not limited to devices for producing 3 light spots. Based on the present disclosure, a person of ordinary skill in the relevant arts would be able to easily make and use other embodiments of 3D waveguide devices configured to produce other patterns of light spots on the end-face 30 of the MMF in FIG. 2. Indeed, such a person of ordinary skill would understand that such other embodiments may be configured to produce any of the patterns A-F of light spots as illustrated in FIG. 3.

Whereas in the present application, some embodiments of the optical end-face coupler 6 of FIG. 2 have been illustrated as producing patterns of light spots in which individual ones of the light spots are spatially separated, the inventions are not limited to such special patterns. Herein, the expression "light spot" includes both localized spots of light, e.g., circular lighted spots, and more general lighted areas. A light spot may even be a collection of disconnected lighted areas. Indeed, some of the tapered fiber bundle 6' and the 2d waveguide device 6" of FIGS. 7 and 8 can be constructed to form a pattern of such lighted regions from individual received light beams. Using such a lighted region to couple an individual data-modulated optical carrier to the end-face 30 of the MMF of FIG. 2 can still substantially uniformly spread the power of the individual data-modulated optical carrier over some preselected sets of orthonormal propagating modes wherein some of the modes have nontrivially different intensity and/or phase profiles.

Some embodiments of the optical communications system 10 of FIG. 1 may also implement differential group delay compensation, e.g., as described in U.S. provisional patent application No. 61/701,613, filed on Sep. 15, 2012. This application is incorporated herein by reference in its entirety.

The inventions are intended to include other embodiments that would be obvious to one of skill in the art in light of the description, figures, and claims.

What we claim is:

1. An apparatus comprising:
an optical transmitter including a plurality of optical data modulators and an optical end-face coupler, each of the optical data modulators being configured to output a corresponding data-modulated optical carrier, the optical end-face coupler being configured to direct the data-modulated optical carriers into a pattern of light beams to illuminate an end-face of a multi-mode optical fiber with a pattern of light spots; and
wherein the optical end-face coupler is configured to cause each of the data-modulated optical carriers to excite a corresponding combination of orthonormal optical propagating modes of the multi-mode optical fiber, some of the orthonormal optical propagating modes of the combination having nontrivially differing intensity or phase profiles; and
wherein the optical end-face coupler is configured to cause each of the data-modulated optical carriers to substantially excite, at least, three of the optical propagating modes with different angular momentum eigenvalues.

2. The apparatus of claim 1, wherein the optical end-face coupler is configured to produce a pattern of light spots that rotate into the light spots of the produced pattern under a group of discrete rotations about a center of the end-face of the multi-mode optical fiber; and wherein the light spots are in first and second groups, the one or more light spots of each of the groups forming a pattern centered on a center of the end face, the one or more light spots of one of the groups being located at a larger distance from the center of the end-face than the one or more light spots of the other of the groups.

3. The apparatus of claim 1, further comprising an all-optical multi-mode fiber channel having a sequence of all-optically end-connected multi-mode optical fiber spans, the multi-mode optical fiber being a segment of a first of the multi-mode optical fiber spans in the sequence.

4. The apparatus of claim 3, wherein some of the multi-mode optical fiber spans of the sequence are hybrid optical fiber spans constructed to provide differential group delay compensation.

5. The apparatus of claim 3, further comprising an optical receiver being configured to evaluate data streams carried by the data-modulated optical carriers by performing MIMO processing on sets of measurements on light received from the all-optical multi-mode fiber channel.

6. The apparatus of claim 1,
wherein the combinations of the orthonormal optical propagating modes of the multi-mode optical fiber are linearly independent; and
wherein the optical coupler is configured to cause optical power of each of the data-modulated optical carriers to substantially uniformly spread over the orthogonal optical propagating modes of the corresponding combination.

7. The apparatus of claim 6, wherein the optical coupler is configured to cause optical power of at least one of the data-modulated optical carriers to be spread over the optical propagating modes such that each of the optical propagating modes of a corresponding one of the combinations receives at least ½ as much of the optical power as each other of the optical propagating modes therein.

8. The apparatus of claim 6, wherein the optical end-face coupler is a free-space optical device further comprising a set of reflectors located and oriented to redirect the data-modulated optical carriers to be substantially parallel.

9. The apparatus of claim 6, wherein the optical end-face coupler includes a tapered fiber bundle having input optical fibers connected to receive the data-modulated optical carriers and an output end capable of illuminating the end-face with the pattern of light spots.

10. The apparatus of claim 6, wherein the optical end-face coupler includes a 3D waveguide device.

11. An apparatus comprising:
an optical transmitter configured to transmit a plurality of data-modulated optical carriers, in parallel, and to illuminate an end-face of a multi-mode optical fiber with a pattern of light spots, each of the light spots being formed by a corresponding one of the data-modulated optical carriers; and wherein in the pattern, each light spot is relatively located to spread optical power of the corresponding one of the data-modulated optical carriers over a corresponding set of orthonormal optical propagating modes having different lateral intensity or phase distributions in the multi-mode optical fiber; and wherein a subset of the light spots of the pattern have centers located on a circle, the light spots of the subset having about equal arc-separations on the circle; and wherein only 3, 5, 7, or 9 of the light spots of the pattern have centers located on the circle.

12. The apparatus of claim 11, wherein only 5, 7, or 9 of the light spots of the pattern have centers located on the circle.

13. The apparatus of claim 11, wherein the pattern includes one of the light spots about at a center of the circle.

14. The apparatus of claim 11, wherein a second subset of the light spots includes three or more of the light spots, the light spots of the second subset having centers located along a second circle co-centric with the center of the end-face, the first and second circles having radii of different sizes.

15. The apparatus of claim 14, wherein the two subsets are formed of different numbers of the light spots.

16. The apparatus of claim 11, wherein the optical transmitter is configured to transmit power of at least one of the data-modulated optical carriers such that each optical propagating mode of the corresponding one of the sets receives at least ½ as much of the power of the at least one of the data-modulated optical carriers as each other of the optical propagating modes of the corresponding one of the sets.

17. The apparatus of claim 11, wherein the optical transmitter includes a tapered fiber bundle being connected to receive the data modulated optical carriers on input optical fibers thereof and being configured to form the pattern by transmitting received light from an end-face thereof.

18. The apparatus of claim 11, wherein the optical coupler is a free-space optical device in which reflectors are configured to redirect the data-modulated optical carriers to be substantially parallel.

19. The apparatus of claim 11, further comprising a sequence of spans of multi-mode optical fiber serially connected to form an all-optical multi-mode fiber channel, a first of the spans of multi-mode optical fiber of the sequence having an end face positioned to be illuminated by the pattern formed by the optical transmitter.

20. The apparatus of claim 19, further comprising an optical receiver being optically connected to receive light emitted by a last of the spans of multi-mode optical fiber of the sequence and being configured to demodulate a data stream carried by different ones of the optical propagating modes thereof.

21. The apparatus of claim 11, wherein the optical transmitter includes a 3D waveguide device connected to receive the data modulated optical carriers on inputs thereof and being configured to form the pattern by transmitting received light from an end-face thereof.

* * * * *